United States Patent [19]

Shishkin et al.

[11] Patent Number: 4,865,673

[45] Date of Patent: Sep. 12, 1989

[54] METHOD OF APPLYING A PROTECTIVE COATING TO THE INNER SURFACE OF A PIPELINE AND DEVICE FOR CARRYING OUT THE METHOD

[75] Inventors: Viktor V. Shishkin; Nikolai F. Kryazhevskikh, both of Krasnodar; Viktor N. Oleinik, Moscow; Yaroslav P. Sushkov, Krasnodar; Evgeny G. Lukin, Alma-Ata; Petr G. Sokol, Krasnodar; Igor A. Chajuk, Novocherkassk; Jury S. Lipatov; Roman A. Veselovsky, both of Kiev; Boris A. Kiselevsky, Moscow, all of U.S.S.R.

[73] Assignee: Inzhenerny Tsentr "Truboprovod", Krasnodar, U.S.S.R.

[21] Appl. No.: 153,274

[22] PCT Filed: Feb. 20, 1986

[86] PCT No.: PCT/SU86/00011

§ 371 Date: Oct. 19, 1987

§ 102(e) Date: Oct. 19, 1987

[87] PCT Pub. No.: WO87/05088

PCT Pub. Date: Aug. 27, 1987

[51] Int. Cl.⁴ ............................................. B29C 63/36
[52] U.S. Cl. ................................... 156/156; 156/287; 156/294; 156/391; 264/270; 427/238
[58] Field of Search ............... 156/156, 287, 292, 294, 156/382, 391, 165; 264/269, 270; 427/238; 405/155

[56] References Cited

U.S. PATENT DOCUMENTS

| | | | |
|---|---|---|---|
| 3,132,062 | 5/1964 | Lang et al. | 156/294 |
| 3,230,129 | 1/1966 | Kelly | 156/287 |
| 3,482,007 | 12/1969 | Routh | 264/269 |
| 3,506,011 | 4/1970 | Silverman | 156/294 |
| 4,415,390 | 11/1983 | Smith | 156/392 |
| 4,456,401 | 6/1984 | Williams | 156/294 |
| 4,602,974 | 6/1986 | Wood | 427/238 |
| 4,622,196 | 11/1986 | Wood | 156/287 |
| 4,637,754 | 1/1987 | Wood | 156/287 |
| 4,752,511 | 6/1988 | Driver | 264/269 |
| 4,758,115 | 7/1988 | Shishkin et al. | 405/155 |

FOREIGN PATENT DOCUMENTS

| | | |
|---|---|---|
| 3414531 | 10/1984 | Fed. Rep. of Germany . |
| 3603597 | 8/1987 | Fed. Rep. of Germany ........ 138/97 |
| 0004971 | 1/1979 | Japan .................................. 156/294 |
| 0152025 | 11/1980 | Japan .................................. 156/294 |
| 698962 | 7/1977 | U.S.S.R. . |
| 1352829 | 5/1974 | United Kingdom . |
| 1449455 | 9/1976 | United Kingdom . |
| 2082285 | 3/1982 | United Kingdom . |

Primary Examiner—Michael W. Ball
Assistant Examiner—Steven D. Maki
Attorney, Agent, or Firm—Lilling & Greenspan

[57] ABSTRACT

A method of applying a protective coating to the inner surface of a pipeline includes the steps of adhering a porous flexible hose to the pipeline inner surface, an end of the hose of which is turned inside out and attached to the pipeline. The hose is moved inside the pipeline by progressively turning it inside out and pressing it to the inner surface of the pipeline by providing an excess pressure in a cavity formed by the portion of the hose turned inside out, and producing a counter-pressure before the hose as the same travels lengthwise of the pipeline. The magnitude of the counter-pressure is maintained at a predetermined level in the course of the hose travel. A piston having a passage for the hose is placed in the cavity formed by the portion of the hose turned inside out, and a binder is placed between the piston and the portion of the hose turned inside out. The binder soaks through the pores of the hose to facilitate the formation of a bond between the hose and the inner surface of the pipeline.

4 Claims, 7 Drawing Sheets

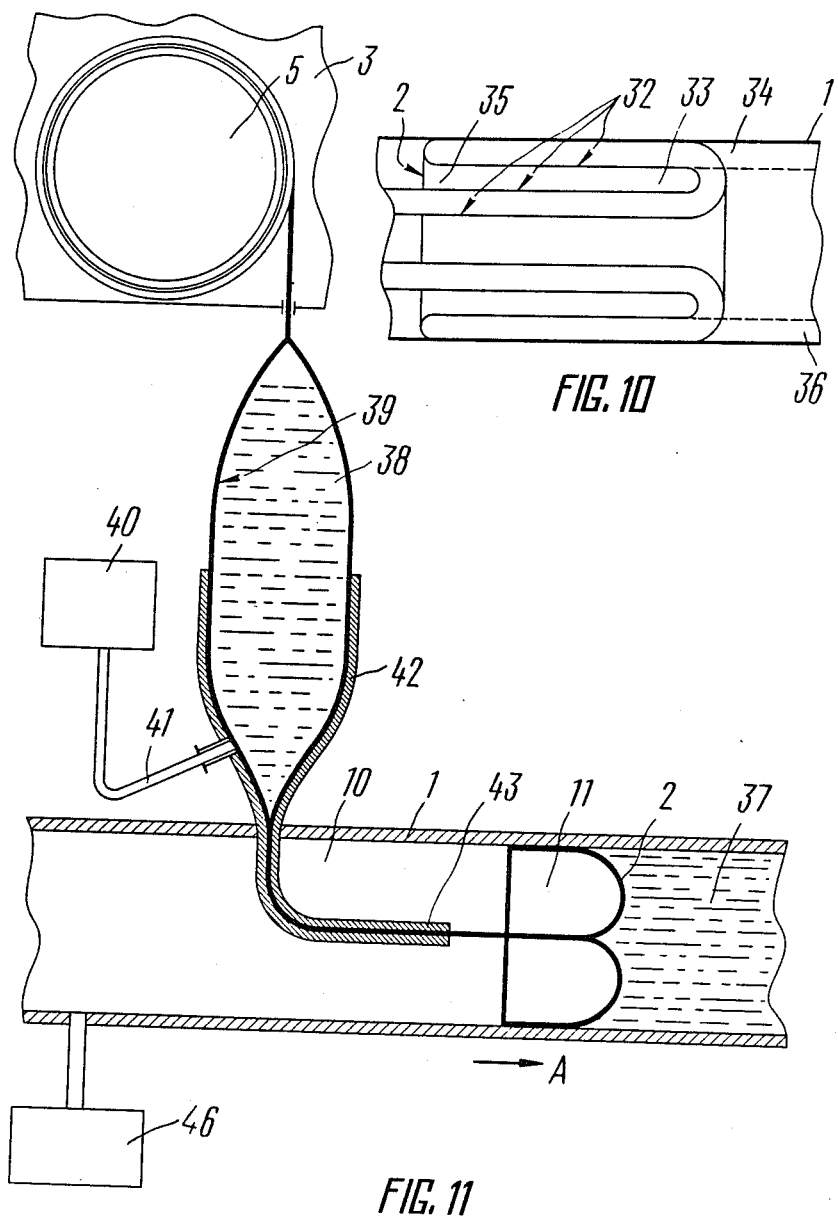

METHOD OF APPLYING A PROTECTIVE COATING TO THE INNER SURFACE OF A PIPELINE AND DEVICE FOR CARRYING OUT THE METHOD

BACKGROUND OF THE INVENTION

1. Field of the Invention

This invention relates generally to the art of maintaining networks of main and delivery high- and low-pressure steel pipelines, and more particularly concerns a method of forming a protective coating on the inner surface of pipelines and a device by means of which such a method can be carried out in a number of industrial applications.

The proposed method can be used for applying protective coatings to pipelines under construction and for making repairs of pipelines after extensive use.

2. Description of the Prior Art

At present, pipelines are protected against corrosion and old pipelines are put to new use by applying a protective coating to their inner surface.

Application of protective coatings to the inner surface of pipelines is carried out by a wide range of methods and devices.

There is known a method of applying a protective coating to the inner surface of pipelines which involves sticking a flexible hose (or shell) to the pipeline interior surface (c.f., e.g., Patent of Great Britain No. 2,082,285 Cl. F 2P 32).

This method envisages the formation of a coating by introducing a porous hose preliminarily impregnated with an adhesive to the pipeline interior. This porous hose is inserted into a flexible hose fabricated from a polymer material. The hoses with their ends turned inside out are then affixed to the inner wall of the pipeline so that the porous hose is placed between the pipeline wall and the polymer hose. By feeding water to a cavity formed by the portion of the hoses turned inside out the latter are moved lengthwise of the pipeline and pressed against the pipeline inner surface. The water is heater to 95° C. for a bond to be formed between the hoses and the pipeline inner surface.

However, the above method of forming a protective coating is inherently complicated and results in high expenditures associated with pipeline construction, since the application of such coatings necessitates preparation of hoses of which one should be impregnated and drawn through the other hose. The method also requires that water inside the pipeline should be heated for the thus formed coating to set. The use of two hoses complicates their application to the pipeline, whereas the weight of the two hoses puts limitations as to the length of coating application within one pass to 200 m, which in turn requires more time for forming a coating. In addition, thin-wall polymer hoses susceptible to rupture are not adaptable for use in the above method.

SUMMARY OF THE INVENTION

It is therefore an object of the present invention to provide a method and a device for forming a protective coating on the inner surface of pipelines by applying thereto through an adhesive or binder such flexible hoses that would not be susceptible to rupture at increased speed of hose application.

This object and other attending advantages are attained in a method of forming a protective coating on the inner surface of a pipeline in which adhered to the inner surface of the pipeline is at least one flexible hose an end of which turned inside out is attached to the pipeline, whereas during the movement of the hose it is progressively turned inside out and pressed against the pipeline surface by providing an excess pressure in a cavity formed by the portion of the hose turned inside out. According to the invention, a counterpressure is produced before the hose as it moves along the pipeline, the magnitude of this counterpressure being maintained at a predetermined level.

The thus produced counterpressure prevents rupture of the flexible hose fabricated even from very thin polyethylene films 0.1 mm in thickness, because the provision of the counterpressure before the hose makes it possible to unload it from tensile stresses exerted thereon, whereby the hose is subjected exclusively to uniformly distributed compression.

Preferably, the counterpressure is produced in the binder and the working fluid occupying the pipeline interior by compressing them in the pipeline before the hose being turned inside out, such compression being effected by introducing into the pipeline a second flexible hose which is moved toward the first hose.

The above arrangement considerably simplifies the provision of counterpressure without resorting to special additional means. Also, it facilitates the rate of applying flexible hoses to the pipeline inner wall, since two hoses are introduced simultaneously to the opposite ends of the pipeline. Another advantage is that this modified form of the proposed method saves on the amount of binder required for the coating application process. In addition, coating application can take place even when the pipeline is filled with the binder incompletely, because under the action of the pressure of working fluid the binder is caused to enter the portion of the hose being turned inside out and wet its surface.

Alternatively, the pipeline can be coated by introducing several coaxially arranged flexible hoses with the end of each such hose turned inside out and attached to the pipeline inner wall; the space formed between the hoses is filled with a binder, whereas a counterpressure is provided before the last hose in the path of travel of such hoses to thereby ensure the application of several layers to the pipeline surface.

Alternatively, simultaneously with introducing a flexible hose into the pipeline, helical layers of tape from tape rolls secured on a piston can be placed onto the inner surface of the pipeline, these rolls of tape being moved by the binder occupying a space between the piston and the flexible hose and therefore providing a counter-pressure, which makes it possible to impart a greater strength to the pipelines during pipeline repairs.

Preferably, a piston having a passage for the hose to be extended therethrough is placed in a cavity formed by the position of the hose turned inside out, whereas the binder is preferably placed between the piston and the portion of the hose being turned inside out, a porous hose being preferably used as the flexible hose to expand process capabilities of the proposed method.

Advisably, prior to applying the flexible hose to the pipeline, the inner surface thereof is treated with a strong solution of any known inhibitor, which is separated from the binder occupying the pipeline interior by a piston. This modified form of the proposed method prevents crevice corrosion and pitting, whereby the service life of the pipeline is extended.

According to one more alternative embodiment of the proposed method, used as the flexible hose is a polyethylene hose having polyvinylchloride inserts, these inserts being stuck to the pipeline inside surface as the hose application proceeds and annular clearances between the inserts being filled with the inhibitor. The aforedescribed arrangement make it possible to reduce the amount of binder to be used for coating application and to provide extra chemical protection of the pipeline.

One more embodiment of the herein proposed method envisages the attachment of the flexible hose to the inside surface of the pipeline by ring members fabricated from a porous material impregnated with a binder, these ring members being spaced equidistantly lengthwise of the hose on its inner surface prior to introducing the hose into the pipeline. This modification of the proposed method speeds up coating application and simplifies connection of hose ends lengthwise of the pipeline.

Preferably, prior to introducing the flexible hose into the pipeline it is arranged in several layers by turning each such layer inside out relative to the layers between which it is disposed, whereas the movement of the hose inside the pipeline is effected by alternately producing an excess pressure between two layers of the hose in cavities formed by two hose adjacent turned inside out while moving the hose in a direction opposite to the preceding direction of travel of the hose. The aforedescribed makes it possible to extend the length of the pipeline being coated within one coating application pass, as well as to increase the rate of coating application.

Alternatively, a two-component binder can be used, one component of which is moved along the pipeline by the flexible hose to produce a counterpressure therein, whereas the other component is fed to the pipeline through the flexible hose directly to the portion of the hose being turned inside out. This affords an increase in the length of pipeline being coated and provides more favourable conditions for solidification of the hose, since the binder can set only after its components are mixed.

The excess pressure in the pipeline for moving and turning the flexible hose inside out can be alternatively produced by an elastic chamber secured inside the pipeline after the flexible hose and communicable with a system for feeding the working fluid and with the interior of the hose, which simplifies control over the pressure in the hose interior and ensures that the hose is stretched on the surface of the pipeline to a predetermined extent.

When applying a protective coating to the inner surface of a pipeline filled with a product conveyed therethrough, a cavity is preferably produced from the flexible hose impregnated with a binder which is communicated with the system for feeding the working fluid and which expands in the pipeline as the hose is being progressively turned inside out, whereas after the initial portion of the hose has been adhered to the pipeline surface this cavity is communicated with the interior of the pipeline for the product occupying the pipeline to move the flexible hose and turn it further inside out.

Preferably, the portion of the flexible hose being turned inside out is additionally pressed against the inner surface of the pipeline to more uniformly distribute the binder thereon. In a device for carrying out the just described modified form of the method comprising a drum having the flexible hose wound thereon one end of which has a means for attachment to the pipeline, and a piston placed in the pipeline before the portion of the flexible hose being turned inside out. According to the invention, there is provided a hollow housing accommodated in a cavity formed by the portion of the hose turned inside out, which is brought into contact with the surface of the pipeline through the hose when moved along the pipeline by a pull member extending through a passage provided in the piston, this housing accommodating the drum with the flexible hose wound thereon.

In view of the aforedescribed, the proposed method ensures increased speed of applying a protective coating from pressure-tight and pressure-leaking flexible hoses to the inner surfaces of a pipeline. The method affords one to obtain multilayer coatings, as well as coatings which require minimum amounts of binder and coatings exhibiting high resistance to corrosion.

BRIEF DESCRIPTION OF THE DRAWINGS

The invention will now be described in greater detail with reference to various specific embodiments thereof taken in conjunction with the accompanying drawings, in which:

FIG. 10 represents a modified form of applying a flexible hose to the pipeline;

FIG. 11 shows the manner in which the flexible hose is adhered to the inner walls of the pipeline by a two-component adhesive;

DESCRIPTION OF THE PREFERRED EMBODIMENTS

Figure 1:
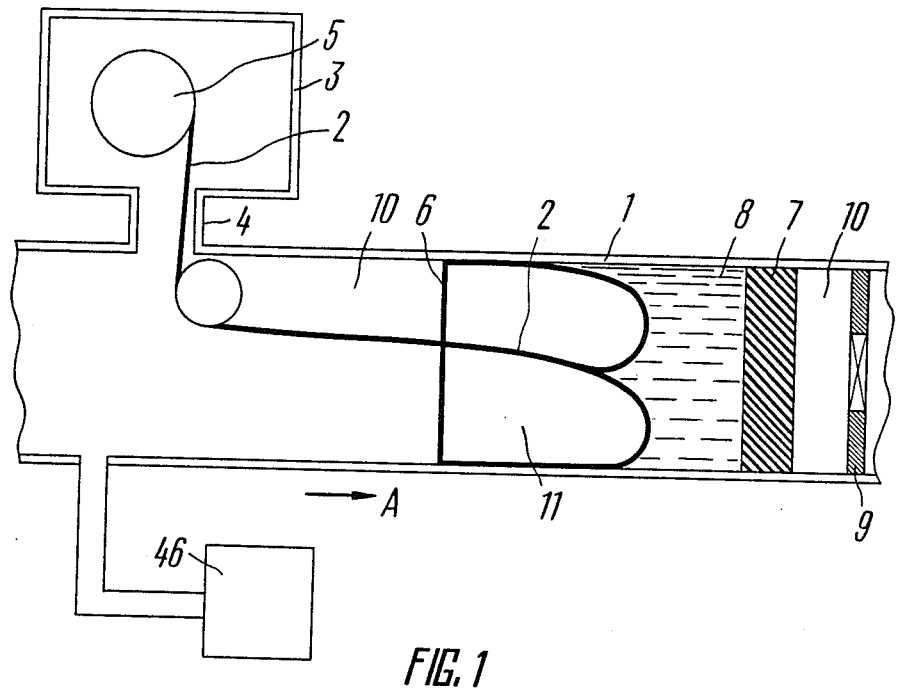
FIGS. 1 to 7 illustrate schematically various modified forms of a method for applying a flexible hose to the inside surface of a pipeline.

The proposed method of applying a protective coating to the inner surface of a pipeline involves gluing to the inner surface of the pipeline 1 (FIG. 1) at least one flexible hose 2 fabricated from such fabrics as glass fiber, kapron, polyethyleneterphthalate, carbon fiber, or such polymer materials as polyethylene. Used for such gluing is any known adhesive suitable for bonding flexible hoses from the above materials to the inner metal surface of the pipeline.

The flexible hose 2 is accommodated in a chamber 3 outside the pipeline 1 and communicable with the pipeline by way of a tube 4, this hose being reeled off a drum 5 to be introduced by its end 6 into the pipeline 1. The end 6 of the flexible hose 2 is turned inside out and attached to the inner surface of the pipeline 1 by any known suitable means.

Inserted into the pipeline prior to the portion of the hose 2 turned inside out is a piston 7 fabricated from any known resilient material (such as rubber), whereas the space between the flexible hose 1 and piston 7 inside the pipeline 1 is filled with a binder 8.

At the other end of the pipeline 1 a means 9 is secured inside the pipeline 1 for controlling the pressure of a fluid 10, such as air, occupying the interior of the pipeline between the piston 7 and the means 9. Used as the means 9 for controlling the pressure of fluid 10 is a pressure-reducing valve or a butterfly throttle or any other element of suitable conventional construction.

The fluid 10 is forced into a cavity 11 formed by the end 6 of the flexible hose 2 turned inside out, the pressure of this fluid acting to move the hose 2 lengthwise of the pipeline 1 together with the binder 8 and piston 7, the hose 2 tending to progressively turn inside out and force the hose 2 to the inner surface of the pipeline 1 smeared with the binder. The fluid 10 occupying the interior of the pipeline prior to the piston 7 is forced therefrom through the means 9. Therewith, a counterpressure is produced by the binder before the moving hose 2, the magnitude of this counterpressure being maintained at a preset level as the hose progressively travels forward of the pipeline in order to prevent the hose 2 from rupturing caused by variations in the travel speed thereof lengthwise of the pipeline due to pipeline slopes tending to change the force of friction of the hose 2 on the inside walls of the pipeline 1 and non-uniform pressure of the fluid 10 due to expanding cavity 11 as the hose travels forward inside the pipeline 1.

Figure 2:
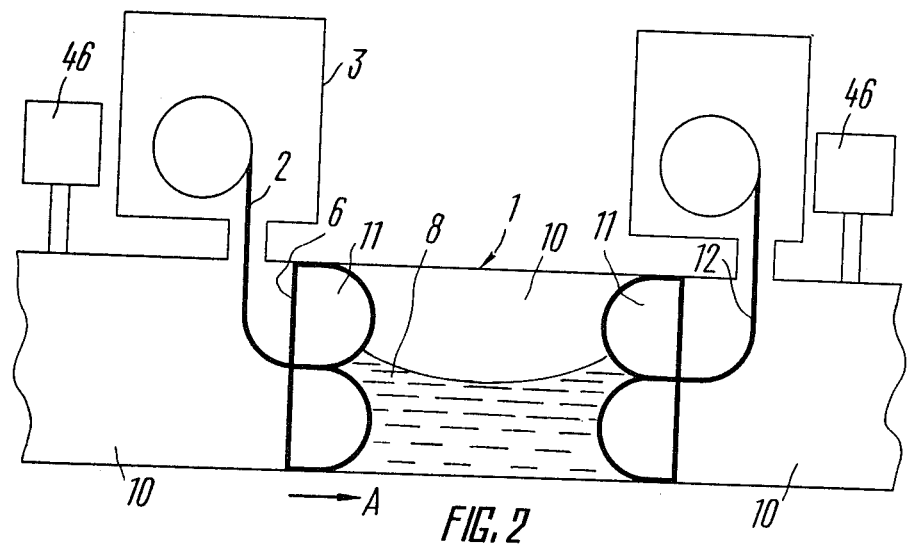

The counterpressure before the portion of the hose 2 being turned inside out is produced by compressing the binder between the piston 7 and the flexible hose 2, or alternatively, by exerting pressure on the binder 8 and fluid 10 (FIG. 2); in the latter case a second flexible hose 12 is moved toward the hose 2, whereas the space between these two hoses is filled with a binder 8 and fluid 10. The binder 8 tends to occupy the bottom of the pipeline 1 due to that the density of the binder 8 is greater than that of the fluid 10.

The movement of the hoses 2 and 12 is accompanied by the formation of a wave of binder 8. Thanks to the pressure of the fluid 10, the binder 8 enters the hoses 2 and 12 providing a pull thereto, whereby the hoses 2 and 12 are stretched prior to their turning inside out to be pressed fold-free to the surface of the pipeline 1. During a further movement of the hoses 2 and 12 the binder 8 completely enters the hoses, whereas the excess fluid is evacuated from the pipeline through a discharge valve (not shown) of any known suitable construction. Preferably, one of the hoses is greater in length than the other hose, whereby the ends of the hoses overlap each other providing a reliable protective coating at the point where the hoses are connected.

Figure 3:
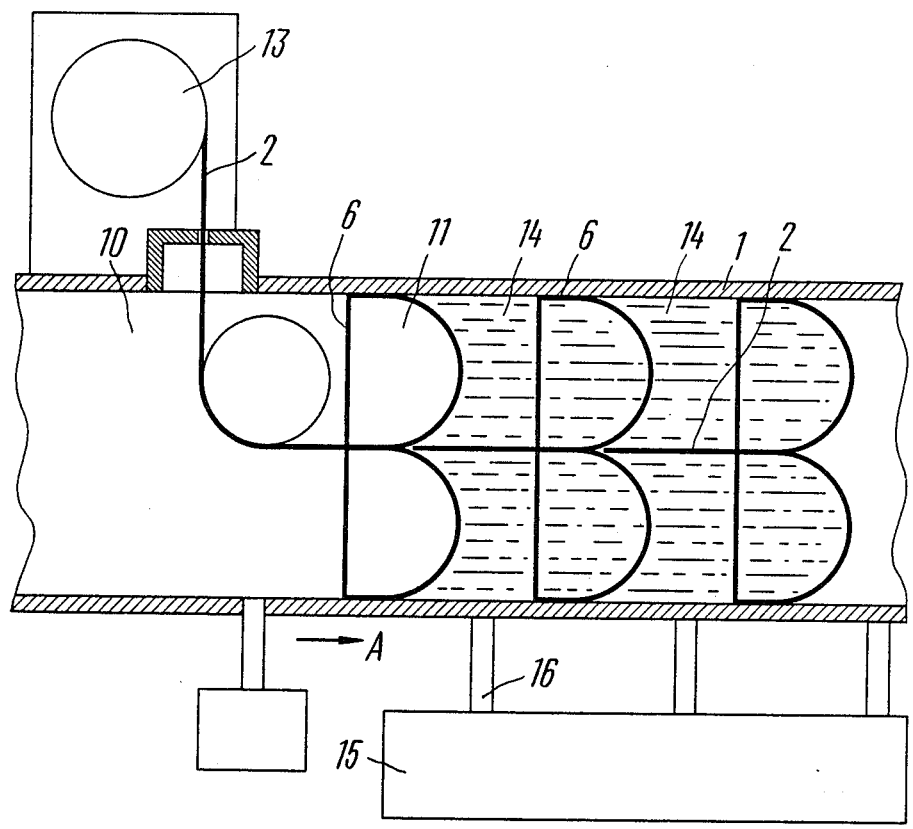

Alternatively, several layers of protective coating can be made on the inner surface of the pipeline by the proposed method. For this purpose the flexible hoses 2 (FIG. 3) are used in a number equal to the number of protective layers to be applied and placed coaxially one inside another and wound on the drum 13. Thereafter, the end of each such hose 2 is turned inside out and affixed to the inside surface of the pipeline 1 as shown in FIG. 3. A space 14 formed between the hoses 2 is filled with an adhesive or binder delivered from a vessel 15 through tubes 16 connected to the pipeline 1 at the pipeline sections where the hose ends are attached thereto. From this vessel 15 the binder is fed through the tube 16 to the pipeline section prior to the first hose 2 to be bonded. Delivered under pressure to the cavity 11 formed by the end of last hose 2 to be stuck to the inside surface of the pipeline 1 is a working fluid (air) which acts to move all the hoses 2 with the binder lengthwise of the pipeline 1 and press them to its inside surface to form a multilayer coating; a counterpressure being produced in the pipeline interior in a space before the last hose in the row of hoses 2. The travel path of the hoses is shown by the arrow A in FIGS. 1 to 14.

Figure 4:
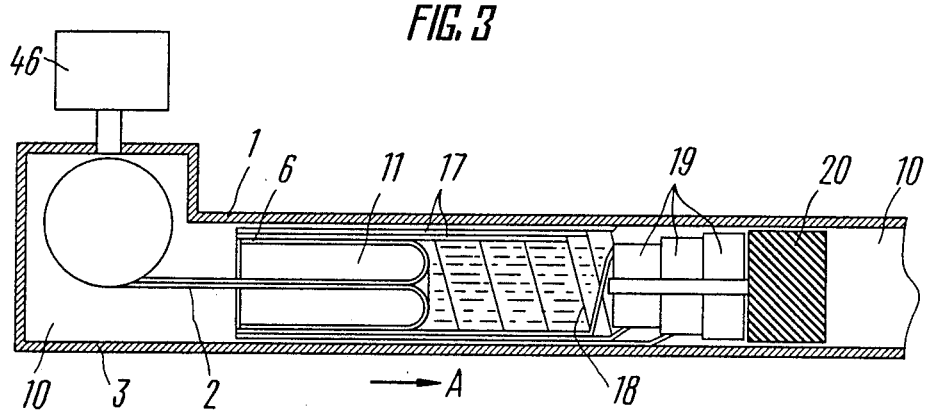

With reference to FIG. 4, in order to strengthen the protective coating being applied to the inside surface of the pipeline, helical layers 17 of tape 18 are placed thereon prior to applying the flexible hose 2. Rolls 19 of such tape 18 are attached to a piston 20, which is secured with a clearance relative to the pipeline walls for the piston to be capable of rotating inside the pipeline 1.

By varying the width of the tapes 18 in each of the rolls 19, direction of coiling and the speed of hose travel (and accordingly the speed of travel of the piston 20) several layers of coating are obtained, the helical layers 17 being placed so that gaps between the coils of tape 18 in each layer 17 are overlapped by tape coils of adjacent layers.

The tapes 18 can be fabricated from any high-strength material, such as steel, carbon-filled plastic, glass fiber, polymer, and the like. A binder is forced into the pipeline 1 to a space between the piston 20 and the hose 2.

The fluid 10 (air) is fed under pressure to the cavity 11 of the hose 2, whereby the hose 2, binder and piston 20 are caused to move along the pipeline. The movement of the piston 20 causes the tape 18 to leave the rolls 19 of tape to be placed onto the inner surface of the pipeline with the binder tending to occupy all the clearances between the layers. Application of the hose 2 to the layers of tape is effected in the aforedescribed manner, the binder occupying the space between the hose 2 and piston 20 providing the required counterpressure.

Figure 5:
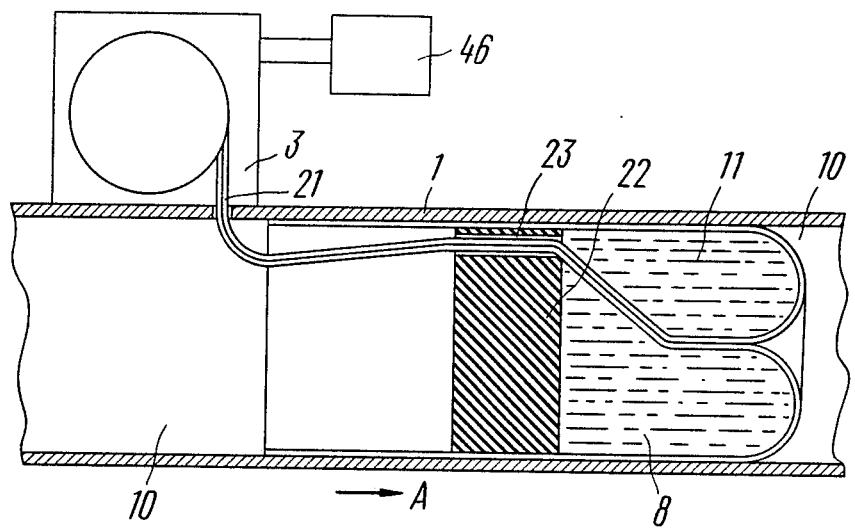
Figure 6:
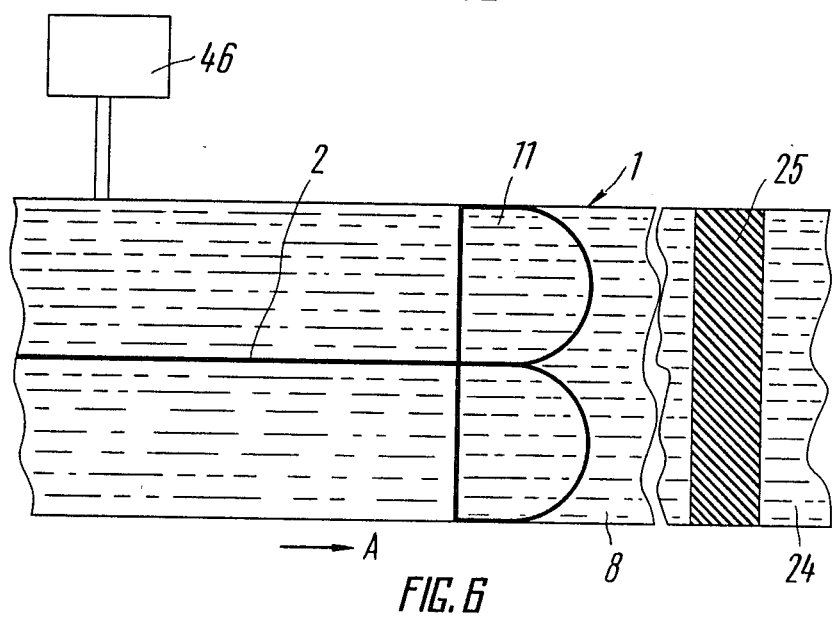

Referring now to FIG. 5, when using a porous hose 21, such as a fabric hose for forming a protective coating on the inside wall of the pipeline, the binder 8 should preferably occupy the cavity 11 defined by the end of this flexible hose 21 turned inside out and attached to the pipeline. A piston 22 is placed in this cavity 11 which acts to retain the binder under pressure, whereby it soaks through the pores of the hose to facilitate the formation of bond between the hose and pipeline inside walls.

The piston 22 has a passage 23 through which the hose 21 is threaded as seen in FIG. 5. In order to impart movement to the hose 21, piston 22 and binder 8 occupying the space therebetween, the fluid 10 under pressure is pumped to the interior of the pipeline, this fluid thus ensuring a counterpressure before the hose 21 is turned inside out.

To ensure a longer life of the protective coating, the inner surface of the pipeline is treated prior to applying the flexible hose thereto with a strong aqueous solution 24 (FIG. 6) of any known inhibitor, such as polyphosphate or a mixture thereof with sodium silicate in a proportion of 5000 mg/l $P_2O_5$ or 500 mg/l $SiO_2$, respectively. For this purpose a piston 25 is inserted into the pipeline 1 before the portion of the flexible hose 2 turned inside out. The space between the piston 25 and the portion of the hose 2 turned inside out is filled with the binder 8, in which a counterpressure is produced, whereas the solution 24 of inhibitor is pumped into the pipeline before the piston 25.

As the flexible hose 2 moves lengthwise of the pipeline, it tends to stick to the inner surface of the pipeline soaked with the inhibitor in the aforedescribed manner.

If the hose 2 leaks, the layer of the inhibitor retained on the inner surface of the pipeline 1, while being dissolved in a product, such as water, transmitted along the pipeline, forms a protective coating at damaged locations with the inhibitor reagents failing to penetrate into the product being conveyed through the pipeline. Therefore, the just described modification of the proposed method can be preferably used for applying protective coatings to pipelines carrying drinking water.

Figure 7:
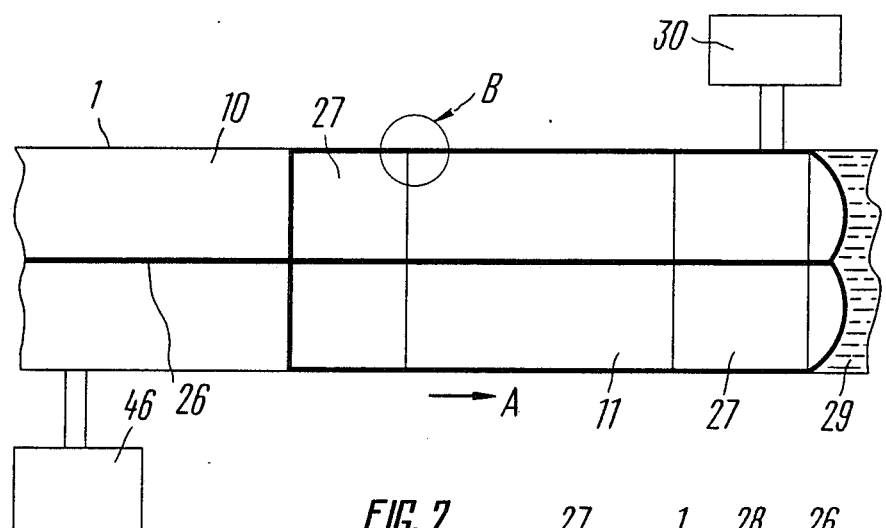
Figure 8:
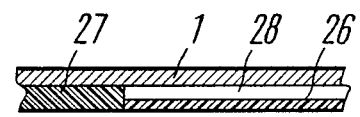
FIG. 8 shows unit B in FIG. 7.
Figure 9:
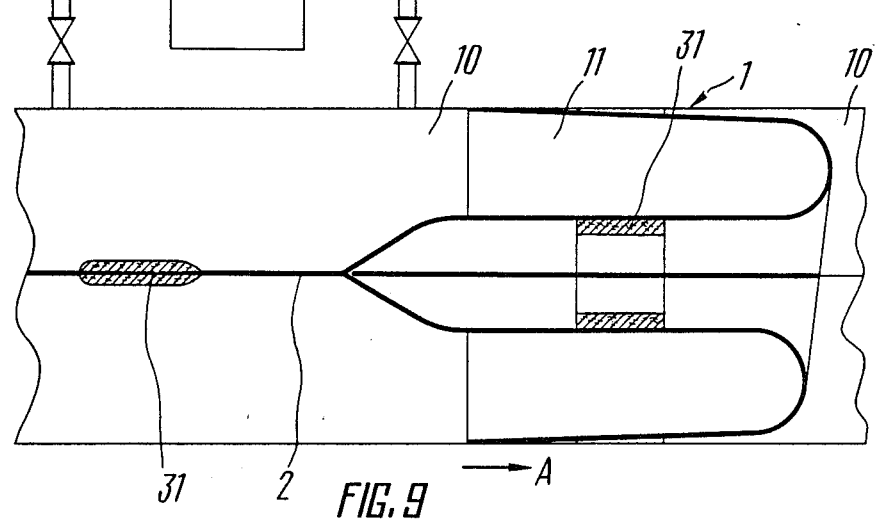
FIG. 9 shows application of a flexible hose by means of ring members fabricated from a porous material.
Figure 12:
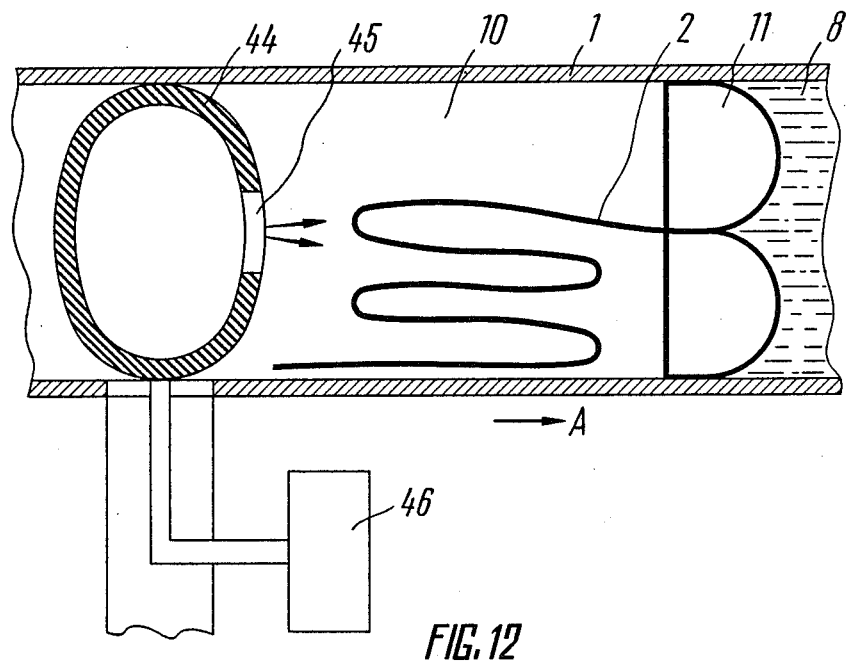
FIG. 12 is a diagrammatic illustration of the manner in which the flow rate of a working fluid is controlled during application of the hose.
Figure 13:
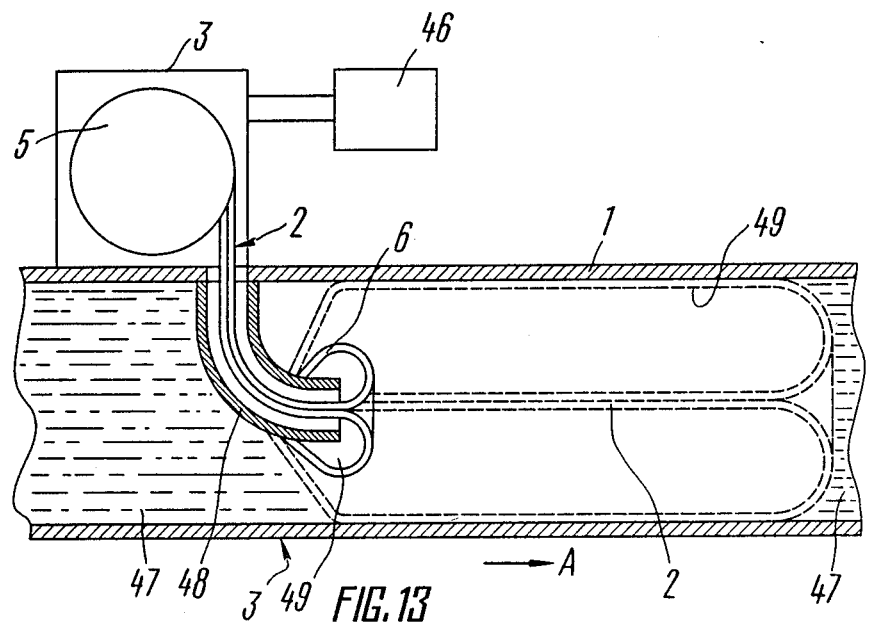
FIG. 13 illustrates schematically the formation of a protective coating on the inner surface of the pipeline filled with a product it conveys.
Figure 14:
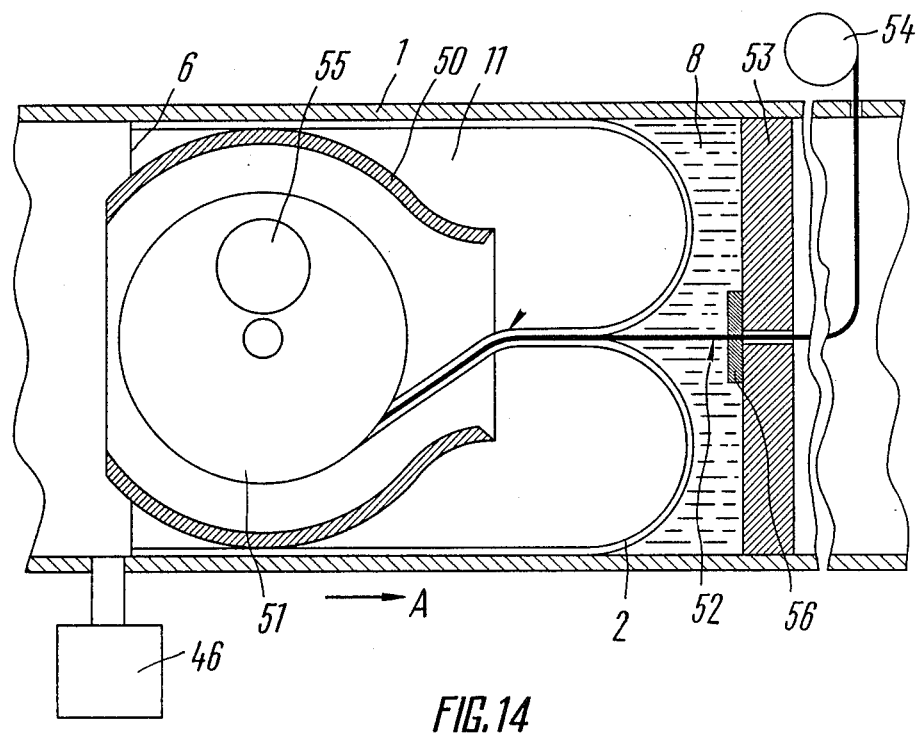
FIG. 14 is a general view of a device for carrying out one modified form of the proposed method of forming a protective coating on the inner surface of a pipeline.

Referring now to a modified form of the proposed method illustrated in FIGS. 7 and 8, use can be made of a polyethylene hose 26 and polyvinyl chloride inserts 27. In the course of applying the hose 26 the inserts are adhered to the surface of the pipeline, whereas annular clearances 28 between the inserts are filled with a solution 29 of inhibitor, such as an aqueous solution of polyphosphate or a mixture thereof with sodium silicate. In this case a space before the portion of the hose 26 turned inside out is also filled with said solution 29 of inhibitor.

As the fluid 10 is pumped to the cavity 11 of the hose 26, the latter is turned inside out to be moved lengthwise of the pipeline 1, the annular clearances 28 tending to be filled with the solution of inhibitor. After this, a water-soluble adhesive is pumped by a pump unit 30 through holes (not shown) made in the wall of the pipeline at locations adjacent the inserts 27. The adhesive, while being mixed with the aqueous solution of inhibitor, bonds the inserts 27 to the inner surface of the pipeline 1. The remaining section of the hose 26 is held on the inner surface of the pipeline 1 by the pressure of product being conveyed along the pipeline by atmospheric air.

With reference to one more modification of the proposed method, the flexible hose (FIG. 9) is attached to the surface of the pipeline 1 by rings 31 of any suitable porous material impregnated with a binder. Prior to introducing the flexible hose 2 to the pipeline 1 the rings 31 are equidistantly spaced lengthwise of the hose at the inner surface thereof.

As the hose 2 is turned inside out, the rings 31 assume their position at the outer side thereof to be pressed and adhered to the inner surface of the pipeline in the aforedescribed manner.

Before being introduced to the pipeline 1 the flexible hose 2 is placed in several layers 32 (FIG. 10) by turning each layer 32 inside out relative to the layers between which such layer 32 is disposed. In this position the hose 2 is inserted into the midportion of the pipeline 1, whereas the hose 2 is moved inside the pipeline to be adhered thereto by alternately producing an overpressure of the working fluid between two hose layers in cavities 33 and 34 formed by two adjacent layers 32 of the hose turned inside out. The fluid 10 is fed to the cavity 33 from its open end 35. Having placed the layer of hose in one direction (illustrated in FIG. 10 by the dotted line), the fluid is fed in the opposite direction, viz. from an open end 36 to the cavity 34, whereby the hose travels in a direction opposite to the preceding one. The hose 2 is therefore applied to the inside surface of the pipeline in parts as the layers of the hose unfold in the pipeline.

Referring to FIG. 11, an adhesive or binder composition comprising two components 37 and 38 is used for bonding the flexible hose 2 to the inner surface of the pipeline. The component 37 is placed in the pipeline 1 before the hose 2, whereas the component 38 is fed through an inner cavity 39 of the hose 2 directly to the pipeline point where the hose 2 is turned inside out. As the hose 2 is turned inside out, the two components 37 and 38 are mixed, whereby the adhesive composition is caused to polymerize to bond the hose 2 with the inner surface of the pipeline 1; the movement of the component 37 lengthwise of the pipeline and the provision of a counterpressure are ensured by the portion of the flexible hose being turned inside out and reeled off the drum 5 through feeding the fluid under pressure to the cavity 11 of the hose 2.

The interior 39 of the hose is replenished with the bindr component 38 from a vessel 40 by any known suitable means (such as an injector needle) and a conduit 41 which is secured to a casing 42 itended to hold the hose containing the binder component in a desired position. The casing 42 has an arched tube 43, which feeds the hose to the interior of the pipeline so shown in FIG. 11.

In order to control the pressure and flow of the fluid 10 fed to the cavity 11 of the hose 2, the pipeline is provided with a pressure-sealed elastic chamber 44 (FIG. 12) having an opening 45 through which the cavity 11 of the hose 2 is communicated with a system 46 for feeding the fluid 10, this system 46 being employed for all modifications of the proposed method represented in FIGS. 1 to 14. After the system 46 (FIG. 12) develops sufficient power to ensure a predetermined flow rate of the fluid 10, the chamber 44 expands to be pressed against the inner surface of the pipeline 1, thus closing its cross-section. In turn, the fluid 10 is conveyed to the cavity 11 of the hose 2 to force the latter to the pipeline surface and move the hose 2 lengthwise of the pipeline 1 together with the binder 8, whereby the hose is adhered to the inner surface of the pipeline 1.

The herein proposed method allows application of a protective coating to the inner surface of the pipeline 1 filled with a product 47 (FIG. 13) conveyed therethrough. With this aim in view the flexible hose 2 impregnated with a binder is delivered to the interior of the pipeline through a tube 48 connected to the system 46 for feeding the working fluid. The end 6 of the hose 2 is turned inside out to be attached to the outer surface of the tube 48 by a spring clamp or by means of a water-soluble collar of any known suitable construction. By feeding the fluid through the tube 48 a cavity 49 is formed in the hose 2 tending to expand as the hose is turned inside out and occupy the interior of the pipeline (shown in FIG. 13 by the dotted lines). The hose progressively moves along the pipeline, and thanks to its expanding interior comes into contact with the inner surface of the pipeline to be eventually adhered thereto. Upon attaining a predetermined pressure of the working fluid in the expanded cavity 49, the spring clamp or water-soluble collar is deactuated, the end of the hose 2 is disconnected from the tube 48, and the cavity 49 is communicated with the interior of the pipeline. As a result, the product occupying the pipeline is admitted to the cavity 49 to function as a means for further moving the hose in the pipeline, turning it inside out, and pressing it to the inner wall of the pipeline, whereas the product occupying the pipeline before the hose being turned inside out produces a required counterpressure.

The portion of the hose 2 being turned inside out can be more vigorously pressed against the inner surface of the pipeline 1 to facilitate smoothing out of the hose 2 and provide more uniform distribution of the binder.

This effect is attained by moving a housing 50 inside the cavity 11 of the portion of the hose 2 turned inside out, this housing 50 accommodating a drum 51 having the flexible hose 2 wound thereon and a pull member 52 extending through a passage provided in a piston 53 and secured to a pull means 54. The piston 53 is placed inside the pipeline 1 before the hose 2 is turned inside out. Rotation of the drum 51 is controlled by a friction brake 55. Secured at the piston 53 is a sealing means 56 through which the pull member 52 is passed. The binder 8 occupies a space between the hose 2 and piston 53.

The aforedescribed device for carrying out the proposed method of applying a protective coating to the inner surface of a pipeline operates in the following manner.

The system 46 acts to force the working fluid 10 to the cavity 11 of the hose 2, whereas, concurrently, the pull means 54 moves the housing 50 with a predetermined force in this cavity 11 continuously formed by the hose being turned inside out. The housing 50 acts to smooth, straighten out the hose 2 and distribute more uniformly the binder 8 on the inner surface of the pipeline. Subsequent to setting of the binder, the hose is bonded to the pipeline walls to form a protective coating.

The invention can find most efficient application for applying coatings to pipelines under construction intended for supplying municipal and industrial water as well as for transferring therealong oil, gas, petroleum products and waste water. It can also be used for repairing pipelines after extensive use to recuperate or even strengthen damaged pipeline walls.

We claim:

1. A method of applying a protective coating to the inner surface of a pipeline, comprising the steps of attaching to the inner surface of the pipeline (1) at least one flexible hose (2), the turned-out end of which is secured to the pipeline and gradually turned inside out as the hose (2) is moved and pressed against the pipeline surface being coated by building up an excess pressure in a space (11) defined by the turned out portion of the hose, a counterpressure of required magnitude being created in the pipeline ahead of the hose; transmitting excess pressure in the space (11) to the hose portion being turned out; and placing an adhesive composition in a portion of the space (11) confined by a piston that is arranged on the hose (2), wherein the piston is provided by one or more flexible hoses (2) which are, similarly to the first hose along the pipeline, arranged prior to introduction into the pipeline (1) coaxially one inside the other, their turned out ends being secured to the pipeline (1) at a distance from one another to define spaces (14) between the hoses (2), which spaces are filled with an adhesive compound producing a counterpressure for each of the hoses (2) which are advanced along the pipeline (1) to be superposed over one another and produce a multilayer coating.

2. A method as claimed in claim 1, wherein prior to introduction into the pipeline (1) the flexible hose (2) is arranged in several layers, by turning each layer inside out relative to the layers (32) between which it is disposed, and the hose is advanced within the pipeline by successively producing an excess pressure in each of the spaces (33) defined by two adjacent turned out layers (32) of the hose while moving the hose in a direction opposite to the direction in which the hose was turned out in advance.

3. A method of applying a protective coating to the inner surface of a pipeline residing in that at least one porous flexible hose (2) is adhered to the pipeline (1) inner surface (5), an end (6) of said hose being turned inside out and attached to the pipe, said hose being moved inside the pipeline (1) by progressively turning it inside out and pressing to the inner surface of the pipeline by providing an excess pressure in a cavity (11) formed by the portion of the hose turned inside out, producing a counter-pressure before the hose (2) as the latter travels lengthwise of the pipeline, the magnitude of this counterpressure being maintained at a predetermined level in the course of the hose travel, wherein a piston (22) having a passage (23) for the hose to be extended therethrough is placed in a cavity (11) formed by the portion of the hose turned inside out, whereas the binder is placed between the piston (22) and the portion of the hose being turned inside out, and soaks through the pores of the hose to facilitate the formation of a bond between the hose and the inner surface of the pipeline.

4. A method of applying a protective coating to the inner surface of a pipeline residing in that at least one flexible hose (2) is adhered to the pipeline (1) inner surface (5), and end (6) of said hose being turned inside out and attached to the pipe, said hose being moved inside the pipeline (1) by progressively turning it inside out and pressing to the inner surface of the pipeline by providing an excess pressure in a cavity (11) formed by the portion of the hose turned inside out, producing a counter-pressure before the hose (2) as the latter travels lengthwise of the pipeline, the magnitude of this counterpressure being maintained at a predetermined level in the course of the hose travel, wherein the flexible hose (2) is secured to the surface of the pipeline (1) by ring members (3) fabricated from a porous material impregnated with a binder, these ring members (31) being spaced equidistantly lengthwise of the hose (2) on its inner surface prior to introducing the hose (2) into the pipeline.

* * * * *